Nov. 24, 1953           A. O. C. NIER           2,660,677
                         ION SELECTOR
Filed April 12, 1948                        3 Sheets-Sheet 1

ALFRED O. C. NIER  *Inventor*

By Roland A. Anderson
            *Attorney*

Nov. 24, 1953  A. O. C. NIER  2,660,677
ION SELECTOR
Filed April 12, 1948                                    3 Sheets-Sheet 2
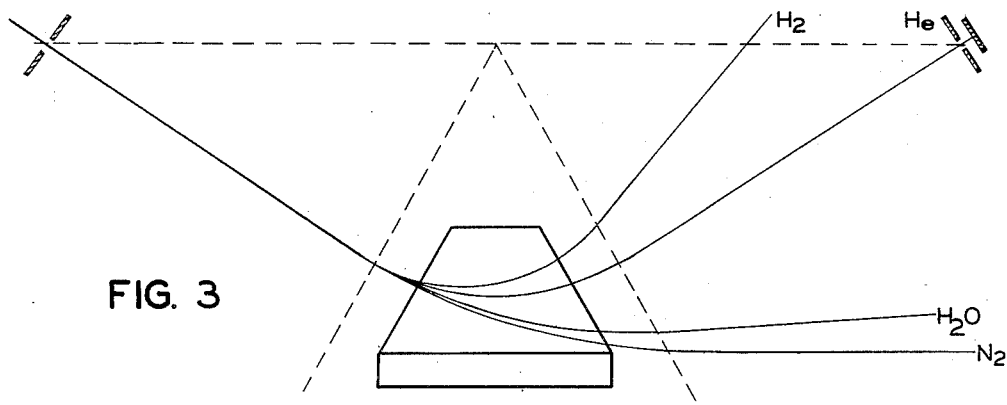
FIG. 3
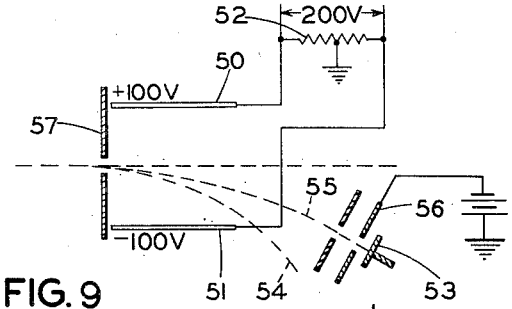
FIG. 9
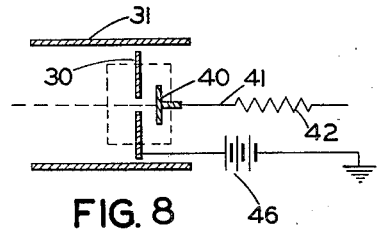
FIG. 8
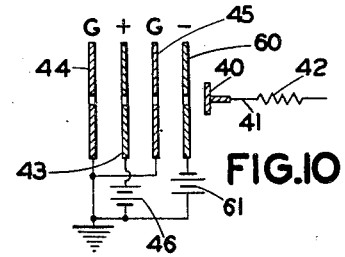
FIG. 10
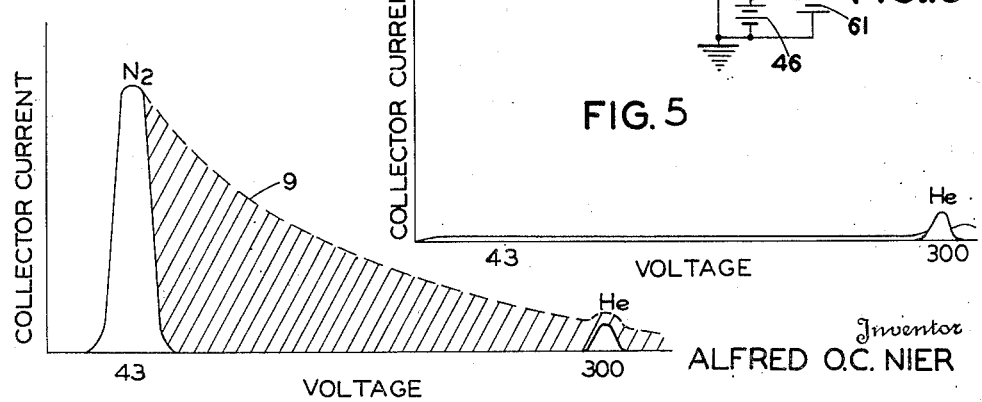
FIG. 5
FIG. 4
Inventor
ALFRED O.C. NIER
By Roland A. Anderson
Attorney Nov. 24, 1953  A. O. C. NIER  2,660,677
ION SELECTOR
Filed April 12, 1948  3 Sheets-Sheet 3

*INVENTOR*
ALFRED O. C. NIER

BY *Roland A. Anderson*
ATTORNEY

Patented Nov. 24, 1953

2,660,677

UNITED STATES PATENT OFFICE 2,660,677

ION SELECTOR

Alfred O. C. Nier, Minneapolis, Minn., assignor, by mesne assignments, to the United States of America as represented by the United States Atomic Energy Commission Application April 12, 1948, Serial No. 20,393

6 Claims. (Cl. 250—41.9)

The present invention relates to mass spectrometers and has for its object to provide improvements in a mass spectrometer to increase the accuracy of the instrument.

Mass spectrometers are frequently used to measure the amount of each component of different gases present in a gaseous mixture, a sample of which is fed to the gas analyzer portion of the mass spectrometer. As is well known in the art, a mass spectrometer involves an ion collecting plate and the ion current to this plate at any given accelerating voltage at the ion source of the mass spectrometer is a measure of the quantity of such ions present in the gaseous mixture, and thus a measure of the amount of that particular gaseous component in the mixture. Naturally current at the collector plate resulting from other causes, that is, other than the said ions, would provide a false reading. Such interfering current may result from stray or secondary electrons. The secondary electrons are caused by fast-moving ions striking molecules of gas, the collecting slit, this is, the slit which precedes the collector plate, walls of the tube, etc. Extraneous ion current which falsifies the reading may also result from slow-moving positive ions, slow-moving positive ions resulting from these ions having collided with other ions or molecules within the evacuated space. This latter result of course occurs more excessively when the vacuum conditions are less perfect than is ordinarily desired.

The primary object of my invention is to provide an improvement in the mass spectrometer which will eliminate the extraneous currents referred to above which tend to falsify the current reading at the collector plate.

More particularly, it is one of the objects of my invention in one form to eliminate extaneous currents resulting from stray or secondary electrons by providing a relatively weak magnetic field parallel to the collector slit for tying up stray and secondary electrons in that vicinity.

Another object of my invention is to eliminate extraneous falsifying currents at the collector plate by providing a positive field, that is, an electrode having a positive potential ahead of the collector plate, the potential thereon being sufficient to reject positive ions not moving at the velocity of the particular ions which it is desired to collect.

Another object of the invention is to provide an improvement for eliminating falsifying currents as described comprising the positive field ahead of the collector plate, as in the preceding object, and also negative fields, that is, electrodes having negative potentials, both before and after the positive field, so as to reject stray electrons which may exist ahead of the positive field and to reject secondary electrons which may be given off from the collector plate itself.

Another object is to eliminate falsifying currents by providing a band-pass filter preceding the collector plate comprising condenser plates having similar voltages of opposite polarity impressed thereon, with a median plane between the plates at ground potential and aligned with the collector slit so that the filter passes only ions of a predetermined desired energy.

The particular problems which my invention is designed to overcome, the manner of meeting these problems, and numerous additional objectives and advantages of my invention will become apparent from the following detailed description and annexed drawings wherein, Fig. 1 is a cross sectional view of a spectrometer tube.

Fig. 3 is a diagrammatic view of the dispersion in a mass spectrometer as illustrated by certain sample gases.

Fig. 4 is a graph illustrating the masking effect that occurs in a mass spectrometer under conditions of poor vacuum giving rise to the existence of slowed ions in the evacuated space.

Fig. 5 is a graph illustrating the the results of the mass spectrometer under conditions of more perfect vacuum.

Fig. 8 is a diagrammatic showing of the collector of a mass spectrometer illustrating another form of my invention wherein a magnetic field is utilized parallel to the collector slit for rejecting secondary electrons.

Fig. 9 is a diagrammatic showing of another form of my invention wherein a band-pass filter is used to intercept slow-moving ions and electrons ahead of the collector.

Fig. 10 is a diagrammatic showing of a further form of my invention.

Figure 1:
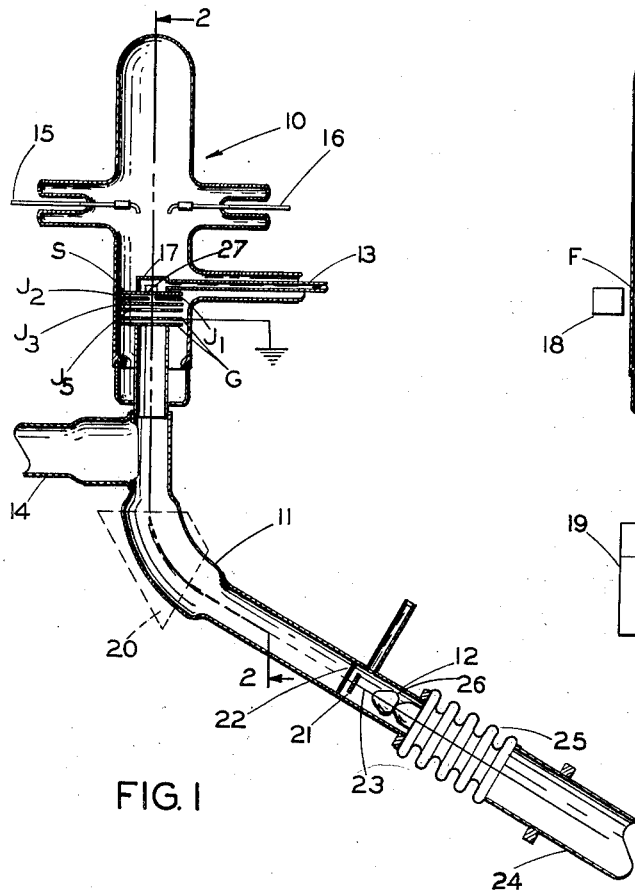

Referring to Fig. 1 of the drawings, the mass spectrometer tube is shown at 10 and involves a glass envelope sealed to the copper analyzer tube 11. The tube surrounding the collector plate itself is designated at 12, and it is made of nickel and suitably secured to the copper tubing portion. Portions surrounding the collector plate are made of nickel to avoid evaporation of metal on the insulation supporting the collector lead. The gas to be analyzed is fed into the instrument through the gas inlet tube 13, as shown, and is pumped out through the copper pump lead as shown at 14. By feeding the gas directly into the source, the pressure there will be considerably higher than in the rest of the apparatus. This feature is desirable because high pressure in the source gives a greater number of ions, hence, more sensitivity, and low pressure in the rest of the apparatus gives better resolution. The various leads for connection to the electrodes within the tubes are sealed to the glass envelope as shown at 15 and 16. The ionization chamber itself is illustrated at 17 and as may be seen on Fig. 2, the filament F is heated to give an electron beam which is received on plate or trap T. This electron beam is kept accurately aligned by means of a magnet field produced by a magnet having pole faces as indicated at 18. The electron beam is immediately above the slit 27 in plate S which is a shield plate.

Figure 11:
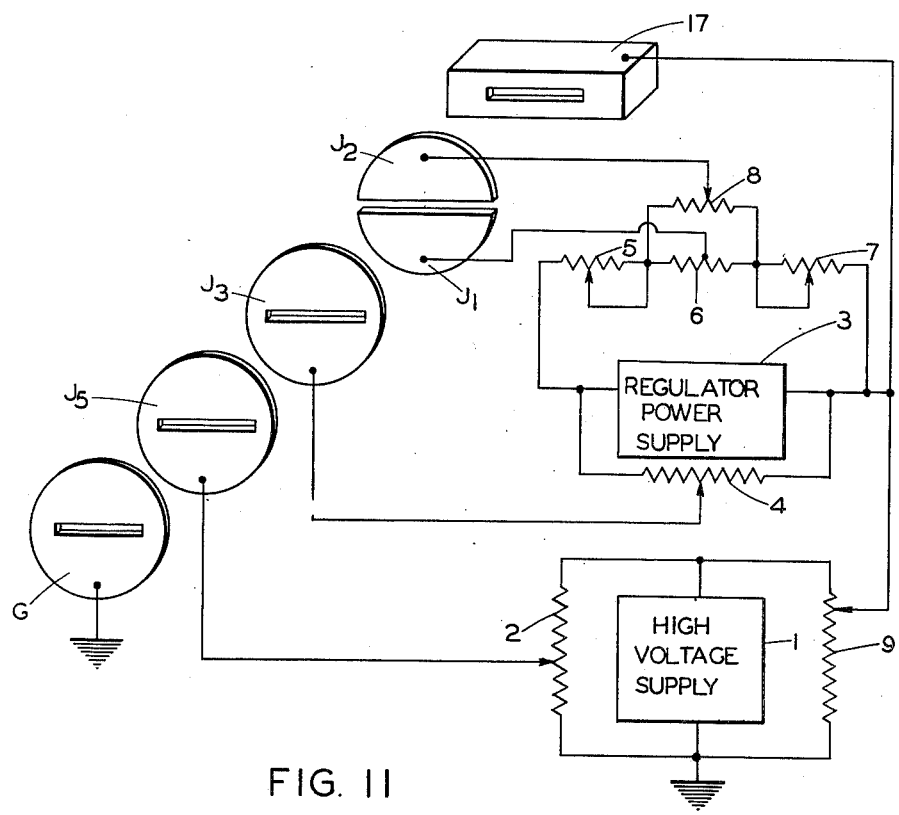
Fig. 11 is an enlarged view of the spectrometer source including power supplies.

Ions formed by collision of the electrons with the gas molecules are drawn through the slit 27 in plate S and accelerated through a series of plates $J_1$, $J_2$, $J_3$, $J_5$ and G. (See Fig. 11.) $J_1$ and $J_2$ are a split pair and permit one to bend the beam to one side or the other to compensate for imperfections in the alignment as well as for the slight bending of the beam produced by the magnetic field used for aligning the electron beam. The remainder of the plates form a lens which not only increases the intensity of the ion beam entering the magnetic analyzer, but also prevents a dropping off of ion intensity for all but the lowest energy ions. The plate marked G is grounded along with the magnetic analyzer housing to which it is tied.

Voltage on the chamber 17 is supplied by the high voltage source 1, designated "High Voltage Supply," across which is a voltage divider the slider of which is connected to the chamber 17. This source is also across voltage divider 2 so that a fraction of this voltage may be impressed on plate $J_5$ which is connected to the slider of divider 2. A separate voltage supply is provided for plates $J_1$, $J_2$ and $J_3$ as designated at 3 and indicated "Regulator Power Supply." This source is across voltage divider 4, the slider of which connects to plate $J_3$ so that a fraction of the voltage may be applied to the latter plate. The source 3 is also across series connected resistors 5, 6 and 7, with divider 8 in parallel with resistor 6. Plate $J_1$ is connected to the mid-point of resistor 6 and plate $J_2$ is connected to the slider of divider 8. As can readily be seen, by this circuit arrangement the resistors 5 and 7 which are variable may be adjusted to equally adjust the voltages on plates $J_1$ and $J_2$, and divider 8 may be adjusted to vary the voltage on plate $J_2$ relative to that on plate $J_1$.

Figure 2:
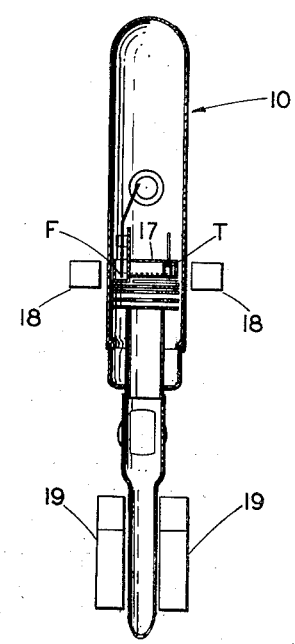
Fig. 2 is a view taken along line 2—2 of Fig. 1.

The magnetic field associated with the tube for bending the ion beam, and that resulting in dispersion of the ions of various masses, is in trapezoidal form as indicated at 20, the pole faces being indicated by numeral 19 on Fig. 2. The collector plate is indicated at 21 and it has the usual plate 22 preceding it with a longitudinal slit therein. The lead from the collector plate is indicated at 23 extending through a glass insulator 26 and passing outwardly from the tube through a cylindrical shielding member 24, the latter member having a flexible coupling, consisting of bellows 25, connecting it to tube 12.

The operation of the mass spectrometer is indicated diagrammatically in Fig. 3. The gas is bombarded with electrons at the source and the resulting ions are focused into a beam which is directed into the aforesaid magnetic field of trapezoidal form. The action of this field bends the path of the ions, the ions having the greatest mass being bent the least, and vice versa. Therefore, the spectrometer effects a separation of the ions of the gaseous mixture, the various component ions in the example of Fig. 3 being $H_2^+$, $He^+$, $H_2O^+$ and $N_2^+$. The apparatus may be adjusted to direct the selected ion into the collecting means. This adjustment is effected by adjusting the voltage drop through which the ions are accelerated at the source, as demonstrated by the following equations:

(1) $\frac{1}{2}mv^2$ (kinetic energy gained by ion) $=eV$ (potential energy lost)

(2) $Hev$ (magnetic force on particle) $=mv^2r$ (centrifugal force)

Eliminating $(v)$ from (1) and (2) gives:

(3) $(m/e)V = kr^2H^2$ $v=$velocity of ion
$m/e=$molecular weight of particle divided by electron units in charge on particle.
$V=$difference in potential (volts) through which the particle fell
$r=$radius of curvature in magnetic field (cm)
$H=$strength of magnetic field between poles (gauss)
$k=$a constant According to Equation 3 for an ion of a given $m/e$, the voltage (V) may be adjusted to produce a desired radius of curvature $(r)$, assuming that the strength of the magnetic field (H) is kept constant. In other words, the accelerating voltage may be used to direct a selected ion to the collecting means. This theory is simple, but as a practical matter there are difficulties in collecting the ions. The present invention has been devised in an attempt to overcome certain of these difficulties as has been pointed out in the aforegoing statement of objectives.

Equation 3, referred to hereinbefore, rests on the assumption that all ions of the same mass and charge move at the same velocity after they leave the ion source ($v$ was eliminated to derive Equation 3). This is actually the case only if the ions move in a high vacuum; collisions with other ions and molecules will slow down a measurable number of the ions in a relatively poor vacuum. Such slow-moving ions will not be collected at the collecting means at the proper voltage V. Worse than that, they will be collected at some larger voltage $V_1$, which is supposed to collect some lighter ion, and will therefore interfere with the reading for the latter. The tendency for the slow-moving ions to interfere with the reading increases markedly with an increase in pressure. In Fig. 4 the voltage drop at the source is plotted against the intensity of the ion current at the collecting plates. The nitrogen peak was made at approximately 43 volts on a certain spectrometer, whereas the helium peak was made at approximately 300 volts. The heights of these peaks indicate the relative quantity of helium and nitrogen present, and are well defined only at low pressures. As the pressure rises, more and more $N_2$ ions occupy the cross hatched area of the graph; that is, they are slowed down considerably and finally result in the curve shown in broken lines at 9 (Fig. 4). At such relatively high pressures a small helium peak could be masked completely by the slow-moving nitrogen ions. Obviously if it is desired to analyze helium in the presence of large quantities of nitrogen, or to detect a small quantity of any ion in the presence of a large quantity of a different ion, it is necessary to have a very low pressure, or in some way, to overcome the masking effect of the slow-moving positive ions. It is desirable to keep the pressure as high as effective operation permits in order to produce as many ions as possible in the source. The present collecting means permits the use of a relatively high pressure by rejecting electrons and slow-moving positive ions from the collecting means.

Figure 7:
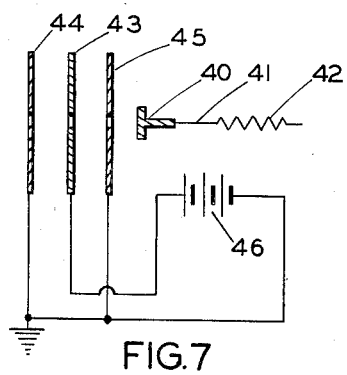
Fig. 7 is a diagrammatic showing of the collector and its associated electrodes illustrating another form of my invention involving the use of the positive field, both preceded and followed by negative fields, ahead of the collector plate.

One form of my invention is indicated diagrammatically in Fig. 7, this figure illustrating a collector plate 40 having a collector lead 41 connected thereto, which lead, in turn, connects to the amplifier system, not shown. The current amplifying system includes an input resistance 42 as shown on the figure. Ahead of the collector plate is a plate 43 having a slit therein into which the ions are directed in the mass spectrometer tube. The plate 43 is maintained at a relatively high positive potential by means of a battery 46. Numeral 44 indicates another plate having a slit, this plate being ahead of plate 43 and having its slit aligned therewith. Still another plate 45 having an aligned slit is between plate 43 and collector plate 40. Plates 44 and 45 are grounded and plate 45 serves as a shield for collector plate 40. The potential on plate 43 is somewhat less than the potential used on the ion source to accelerate the ion selected for collection. Assuming that this selected ion is helium, for the spectrometer under discussion 300 volts was required to direct the helium into the collecting means, and the slit in plate 43 was maintained at +290 volts; this might require a voltage of +300 or more on the plate 43 since the voltage in the open space of the slit is the net result of all charges in the neighborhood. Accordingly, the only ions which can pass through the slit are those having a velocity of over 290 volts energy and under 300 volts energy. This device will reject practically all slow-moving ions and permit the collection of helium ions only. The curve resulting from the use of this device is illustrated in Fig. 5; as there indicated, the helium is no longer masked by slowed-down nitrogen ions. Also the N$_2^+$ peak is eliminated. If it were desired to collect N$_2^+$, it would be necessary to decrease the voltage at plate 43 to about 35 or so; and of course to adjust the potential at the source to 43 volts. Thus any desired ion may be collected; but the potential at both the source and the collector must be suitably adjusted.

Another way of a false reading resulting at the collector plate, as pointed out above, is through the stray or secondary electrons mentioned hereinbefore. The electrons are particularly damaging to the reading if they occur near the slit at the collecting means or occur on the collecting plate itself.

In Fig. 8 of the drawings is illustrated a device employed to reject stray electrons in the vicinity of the collector plate. The device of Fig. 8 is similar to that of Fig. 7 without, however, having the grounded plates 44 and 45. The collector slit plate is indicated at 30 and the spectrometer tube walls at 31. A magnetic field, as indicated by the rectangle, is provided by means of any suitable magnet disposed exteriorally of the spectrometer tube, the field being parallel to the slit in the collector slit plate. This is a relatively weak field, but even a weak field is of sufficient strength to deflect electrons due to their small mass. Referring again to Equation 3, the mass ($m$) of an electron is very, very small as compared with the mass of an ion; and $V$ and $H$ are the same for both the electrons and the ions. Thus, $r$ will be very small for the electron as compared with the ion, even if $H$ is small. Consequently, the magnetic field will tie up the electrons by sharply bending their paths, without noticeably changing the path of the ions. Fig. 8 will be referred to again presently.

In order to still further increase the accuracy of the instrument, my invention contemplates arrangements calculated to reject both electrons and slow-moving ions. My invention contemplates various combinations of elements for achieving these results. The results may be accomplished by the use of a negative field followed by a positive field, or by having the positive field preceded by, and also followed by, a negative field. The desired results may be accomplished by the use of a magnetic field, as described above, together with a positive field. The results may also be achieved by the use of a band-pass filter, as will be explained hereinafter. Fig. 8 additionally has a positive potential impressed on plate 30 so as to reject slow-moving ions in the manner described with respect to Fig. 7, the potential being supplied by battery 46 as in Fig. 7.

Figure 6:
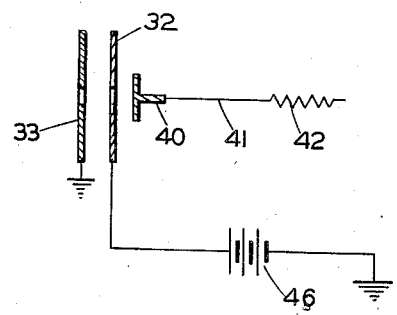
Fig. 6 is a diagrammatic showing of the collector of a mass spectrometer arranged in accordance with one form of my invention.

Fig. 6 shows the arrangement of a negative field followed by a positive field. The device of Fig. 6 is like that of Fig. 7, but it does not have a grounded plate beyond the slit plate 32 which has a positive potential impressed thereon as shown. Plate 33 is grounded, providing a negative field ahead of plate 32.

Referring to Fig. 9 of the drawings, there is shown the structure involving the band-pass filter. The structure involves condenser plates 50 and 51 connected to a power supply involving a 200 volt source connected across a resistance element 52 which has a center tap connected to ground. Thus, 100 volts is impressed on each of the plates 50 and 51, the median plane which is intermediate having a plate and parallel thereto, having a potential of zero. The polarity of the plates 50 and 51 is of course opposite. The median plane is aligned with the center of the slit in a plate 57, and the collector 53 and its associated plates having slits are arranged at an angle as respects the median plane between the plates 50 and 51. Accordingly, when a very fast-moving ion enters the slit in plate 57, it passes between the plates without appreciable deflection. The very slow-moving ions, on the other hand are bent in the manner indicated by the curve 54 and therefore miss the collecting plate. The strength of the field and position of the collecting slit may be arranged to collect only a certain ion indicated on the drawing by the curve.

A negative field is provided near the plate, as indicated by the electrode plate designated numeral 56, to prevent secondary electrons escaping from the plate. Plate 56 is beyond usual collector slit plate. No other negative fields or magnetic fields are necessary. The band-pass filter not only rejects very slow ions, but it also rejects the fast-moving ions so that it selects only a desired band. Furthermore, it rejects stray electrons which, of are immediately attracted to the positive Fig. 10 shows a variation of the arrangement of Fig. 7 which includes a negative field ahead of the collector plate 40 to keep secondary electrons from leaving the plate and falsifying the signal. This negative field is provided by an additional plate, indicated by numeral 60, which has a negative potential impressed thereon from battery 61.

From the foregoing those skilled in the art will observe that my invention is arranged to improve the resolution of a mass spectrometer. Normally the resolution is determined by the width of the slits in the plates at the source and at the collecting means. The narrower these slits are, the better the resolution. The present device, by preventing the masking effect due to slow-moving ions and secondary electrons, accomplishes a purpose similar to that accomplished by narrower slits.

The present invention has been found particularly useful when the mass spectrometer is used as a leak detector. In this connection the spectrometer may be connected to an evacuated system. A gas such as helium may be applied to the outside of the system; and if a leak is present, an increase in the concentration of helium will be indicated by the spectrometer. Spectrometers which are used for this purpose cannot have very narrow slits, wide slits being necessary to obtain the large ion currents which are required for high sensitivity. Also, it is desirable that they operate at relatively high pressures in order to cover a greater range of evacuated systems. The present mechanism permits the use of wider slits and also higher pressures and therefore makes the spectrometer much more useful for leak detecting purposes. It also makes the spectrometer much more sensitive for these purposes. In one instance, a leak of approximately one-tenth the size of the leak detected by former devices was successfully located. This invention may of course be used with mass spectrometers having narrow slits to still further improve the resolution, and it may be used in mass spectrometers operating as continuously analyzing devices.

The embodiments of the invention disclosed in the foregoing are representative of preferred forms of the structure and application and are to be interpreted in an illustrative rather than a limiting sense, the scope of the invention being determined in accordance with the claims appended hereto.

I claim:

1. In a mass spectrometer having an ion producing and accelerating device, an analyzer, and an ion collecting plate, the improvement comprising means for producing a relatively weak magnetic field transverse to the direction of ion movement ahead of the collecting plate for rejecting stray electrons, the strength of said field being insufficient to appreciably deflect ions.

2. In a mass spectrometer having an ion producing and accelerating device, analyzer, and ion collecting plate, the improvement comprising a plate having a slit therein arranged to have ions pass therethrough, said last-mentioned plate having a positive potential impressed thereon so to reject slow-moving ions having less than a given energy, and means for producing a relatively weak magnetic field in a direction transverse to the ion path adjacent the said slit to reject stray electrons and prevent their being collected on the collecting plate, the strength of said field being insufficient to appreciably deflect ions.

3. In a mass spectrometer having means for forming positive ions, a magnetic analyzer, a circuit for producing a potential to propel the ions in the form of a beam through the analyzer in a direction normal to the magnetic field of the analyzer, and a target electrode for receiving the ions thus propelled, the improvement which comprises additional means disposed between said analyzer and said target electrode, and closely adjacent said target electrode, for forming a relatively weak magnetic field normal to the path of said ions for rejecting stray electrons, the strength of said field being insufficient to appreciably deflect ions.

4. In a mass spectrometer having means for forming positive ions, a magnetic analyzer, a circuit for producing a potential to propel the ions in the form of a beam through the analyzer in a direction normal to the magnetic field of the analyzer, and a target electrode for receiving the ions thus propelled, the improvement comprising a plate interposed between said analyzer and said target electrode and having a slit therein to accommodate the beam of ions, said plate having a positive potential impressed thereon so as to reject slow moving ions having less than a given energy, and means disposed in the proximity of said plate and said target electrode for forming a relatively weak magnetic field normal to the path of said ions for rejecting stray electrons, the strength of said field being insufficient to appreciably deflect ions.

5. In a mass spectrometer having means for forming positive ions, a magnetic analyzer, a circuit for producing a potential to propel the ions in the form of a beam through the analyzer in a direction normal to the magnetic field of the analyzer, and a target electrode for receiving the ions thus propelled, the improvement which comprises additional means disposed between said analyzer and said target electrode, and closely adjacent said target electrode, for forming a constant relatively weak unidirectional magnetic field normal to the path of said ions for rejecting stray electrons, the strength of said field being insufficient to appreciably deflect said ions.

6. In a mass spectrometer having means for forming positive ions, a magnetic analyzer, a circuit for producing a potential to propel the ions in the form of a beam through the analyzer in a direction normal to the magnetic field of the analyzer, and a target electrode for receiving the ions thus propelled, the improvement comprising a plate interposed between said analyzer and said target electrode and having a slit therein to accommodate the beam of ions, said plate having a positive potential impressed thereon so as to reject slow moving ions having less than a given energy, and means disposed in the proximity of said plate and said target electrode for forming a constant relatively weak unidirectional magnetic field normal to the path of said ions for rejecting stray electrons, the strength of said field being insufficient to appreciably deflect ions.

ALFRED O. C. NIER.

References Cited in the file of this patent

UNITED STATES PATENTS

| Number | Name | Date |
|---|---|---|
| 2,370,637 | Langmuir | Mar. 6, 1945 |
| 2,412,359 | Roper | Dec. 10, 1946 |
| 2,541,656 | Long | Feb. 13, 1951 |

OTHER REFERENCES

Smythe: Physical Review, December 1926, vol. 28, pp. 1275–1286.